(12) United States Patent
Varda et al.

(10) Patent No.: US 12,050,799 B1
(45) Date of Patent: Jul. 30, 2024

(54) STATE MANAGEMENT AND PERSISTENT DATA STORAGE IN A DISTRIBUTED CLOUD COMPUTING NETWORK

(71) Applicant: Cloudflare, Inc., San Francisco, CA (US)

(72) Inventors: Kenton Taylor Varda, Austin, TX (US); Glen Patrick Maddern, Melbourne (AU); Alex Dwane Robinson, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/401,201

(22) Filed: Dec. 29, 2023

(51) Int. Cl.
  *G06F 3/06* (2006.01)
(52) U.S. Cl.
  CPC ............ *G06F 3/0647* (2013.01); *G06F 3/067* (2013.01); *G06F 3/0604* (2013.01)
(58) Field of Classification Search
  None
  See application file for complete search history.

(56) References Cited

U.S. PATENT DOCUMENTS

| | | | |
|---|---|---|---|
| 8,589,603 B2 | 11/2013 | Craddock et al. | |
| 8,631,188 B1 | 1/2014 | Heath et al. | |
| 10,498,812 B1 | 12/2019 | Varda et al. | |
| 10,572,510 B2 | 2/2020 | Lee et al. | |
| 11,321,152 B1* | 5/2022 | Varda | G06F 3/0673 |
| 2022/0263897 A1* | 8/2022 | Karr | G06F 11/1471 |

OTHER PUBLICATIONS

Final Office Action, U.S. Appl. No. 17/734,933, Jul. 7, 2023, 22 pages.
Non-Final Office Action, U.S. Appl. No. 17/370,663, Nov. 17, 2021, 19 pages.
Non-Final Office Action, U.S. Appl. No. 17/734,933, Mar. 1, 2023, 25 pages.
Notice of Allowance, U.S. Appl. No. 17/370,663, Jan. 21, 2022, 9 pages.
Notice of Allowance, U.S. Appl. No. 17/734,933, Aug. 23, 2023, 9 pages.
Varda, Workers Durable Objects Beta: A New Approach to Stateful Serverless, Cloudflare, Sep. 28, 2020, 16 pages, downloaded at: https://blog.cloudflare.com/introducing-workers-durable-objects/.

* cited by examiner

*Primary Examiner* — Brian R Peugh
(74) *Attorney, Agent, or Firm* — NICHOLSON DE VOS WEBSTER & ELLIOTT LLP (57) ABSTRACT

A first compute server of a distributed cloud computing network executes an application that controls reading and writing access to associated persistent data. The first compute server performs a write operation to the persistent data on local storage, notifies a piece of code that controls outgoing messages from the application that the write operation is pending, and transmits write information for the write operation to a set of other compute servers. If an acknowledgement of the write information is received from a quorum of the other compute servers, the application notifies the piece of code that the write operation is confirmed. Periodically the write information is transmitted to an external storage system. If a confirmation that the write information has been written is received from the storage system, the first compute server transmits a write confirmation notice to the other compute servers, which can then delete the write information.

21 Claims, 6 Drawing Sheets

STATE MANAGEMENT AND PERSISTENT DATA STORAGE IN A DISTRIBUTED CLOUD COMPUTING NETWORK

FIELD

Embodiments of the invention relate to the field of computing; and more specifically, to state management and persistent data storage in a distributed cloud computing network.

BACKGROUND

There are several different ways to store data. A common approach is to use a monolithic database model that is fundamentally centralized. These databases are sometimes claimed to be distributed, but they either are based on a global synchronization procedure (e.g., consistent and partition tolerant) or eventual consistency through merging changes (e.g., highly available and partition tolerant). Global synchronization can be slow especially as the distributed database and the number of nodes grows. Eventual consistency is difficult to do correctly and is error prone.

Write operations are confirmed as successful once they are fully durable (e.g., the data is successfully stored on disk). Depending on the architecture of the database, confirming the write was successful may be relatively slow. However, a write operation that is confirmed before the write operation is fully complete (and potentially synchronized depending on the architecture) is undesirable as there is a possibility that the write operation may fail, the disk may fail, or otherwise the data could be lost. If the write does not complete successfully, the user should be presented with an error message.

SUMMARY

A first compute server of a distributed cloud computing network executes an application that controls reading and writing access to associated persistent data. The first compute server performs a write operation to the persistent data on local storage, notifies a piece of code that controls outgoing messages from the application that the write operation is pending, and transmits write information for the write operation to a set of other compute servers. The piece of code that controls outgoing messages prevents messages from the application to be transmitted to external entities until the write operation is confirmed. If an acknowledgement of the write information is received from a quorum of the other compute servers, the application notifies the piece of code that the write operation is confirmed. Periodically the write information is transmitted to an external storage system. If a confirmation that the write information has been written is received from the storage system, the first compute server transmits a write confirmation notice to the other compute servers, which can then delete the write information. If an acknowledgment of the write information is not received from a quorum of the other compute servers, the application may consider the write operation to have failed and any outgoing network messages are discarded and replaced with errors. If one of the other compute servers does not receive a write confirmation notice within a certain timeout period, or if it otherwise detects a failure, that compute server can write the information to the external storage system itself.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

State management and persistent data storage in a distributed cloud computing network is described. Persistent storage is provided for an application that executes on the distributed cloud computing network. The application may be a piece of code (e.g., JavaScript) and may be implemented in an isolated execution environment such as an isolate of the V8 JavaScript engine executing on a server of the distributed cloud computing network. The persistent storage of the application is backed by a binary large object (blob) storage system that can be external to the distributed cloud computing network or another node on the distributed cloud computing network. Writes to the persistent data are relayed to a set of one or more other servers (followers) of the distributed cloud computing network and are periodically sent to the blob storage system. Each follower confirms the write to the leader and holds onto the write information until it receives a confirmation that the write has been confirmed at the blob storage system. Once a quorum of followers have confirmed the write to the leader, the application can treat the write as being confirmed even if yet not confirmed at the blob storage system. If a follower does not receive such a confirmation within a certain timeout period, the follower can write the information to the blob storage system itself. If a follower receives such a confirmation within the certain timeout period, the follower can delete, or mark for deletion, the write information.

Embodiments described herein allow the application to access storage locally (e.g., where the application is executing) while relaying updates to an external long-term blob storage system. The application gets the performance benefits of local storage that can be accessed in-thread, combined with the long-term reliability, low operational burden, and cost-effectiveness of a bulk blob storage system.

A write is confirmed when a quorum of followers acknowledge the write. However, in some embodiments, the application is allowed to continue without waiting for the write confirmation from the quorum of followers with the exception of an outgoing network message, which is prevented from being sent until the write operation has been confirmed. Thus, the application can assume the storage write operation succeeded and continue executing the code. If the storage operation fails, then no outgoing message is delivered and an error message is put in place. In the rare event that a write operation fails, a premature confirmation of a successful write operation is not received by remote entities. This means that although the write is assumed to be confirmed, no other entity will receive that confirmation until the write is confirmed. In the meantime, the application can execute other code concurrently that it would otherwise have had to wait to run for the confirmation that the storage write completed. Thus, the application can continue execution in parallel with the write being confirmed without the risk of prematurely confirming a failed write to remote parties.

Figure 1:
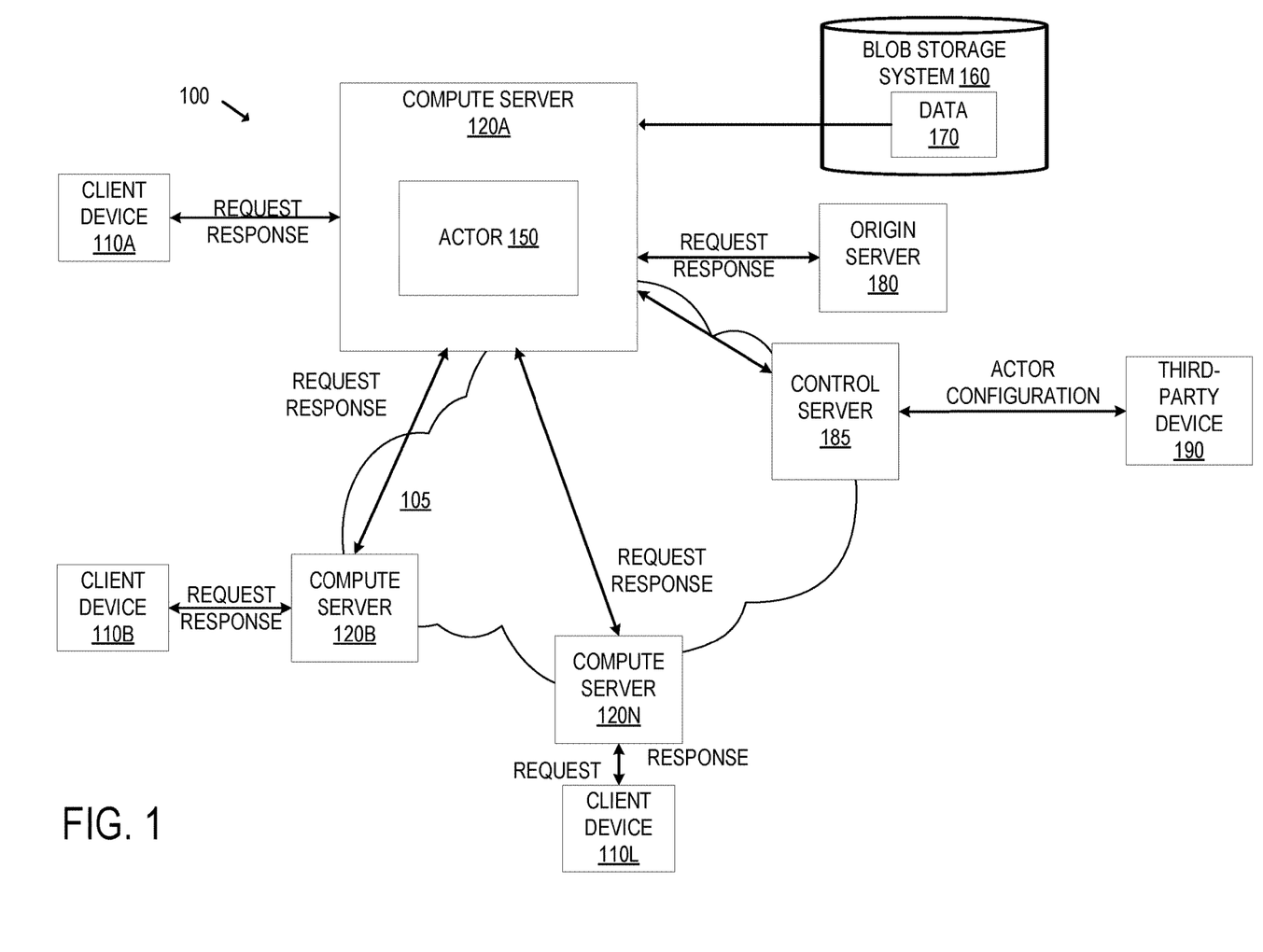
FIG. 1 illustrates an exemplary embodiment of state management and persistent data storage in a distributed cloud computing network according to an embodiment.

FIG. 1 illustrates an exemplary embodiment of state management and blob storage in a distributed cloud computing network according to an embodiment. The system 100 includes the client devices 110A-L, the compute servers 120A-N, the blob storage system 160, the origin server 180, the control server 185, and the third-party device 190.

Each client device is a computing device (e.g., laptop, workstation, smartphone, mobile phone, tablet, gaming system, set top box, wearable device, Internet of Things (IoT) device, etc.) that can transmit and/or receive network traffic. Each client device may execute a client network application such as a web browser, native application, or other application that can access network resources (e.g., web pages, images, word processing documents, PDF files, movie files, music files, or other computer files).

The compute servers 120A-N are part of the distributed cloud computing network 105. The compute servers 120A-N are geographically distributed (e.g., in different locations throughout the world). There may be hundreds or more compute servers 120. Each compute server 120 may be one or more physical servers that are part of the same PoP. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

Each compute server may execute an application such as the actor 150. Each actor includes a combination of an instantiation of a piece of code and persistent data that belongs to the instantiation of the piece of code. Each instance of an actor has its own private and persistent data that the actor can read and/or modify and which no other actor can directly access. The piece of code can be, for example, a piece of JavaScript or other interpreted language, a WebAssembly (WASM) compiled piece of code, or other compiled code. In an embodiment, the piece of code is written using standard Web Platform APIs such as Fetch API for handling HTTP requests. An actor locks the data such that it is the sole owner of the data while it is being executed. Other entities that wish to interact with the data send messages to the actor that owns the data. In an embodiment, each instantiated actor script is run in an isolated execution environment, such as run in an isolate of the V8 JavaScript engine. For instance, in the example of FIG. 1, the actor 150 may execute in an isolated execution environment, such as run in an isolate of the V8 JavaScript engine. The isolated execution environment can be run within a single process. In an embodiment, the instantiated actor scripts are not executed using a virtual machine or a container. In an embodiment, a particular actor script is loaded and executed on-demand (when and only if it is needed) at a particular compute server of the distributed cloud computing network.

The origin server 180, which may be owned or operated directly or indirectly by a customer of the cloud computing platform, is a computing device on which a network resource resides and/or originates (e.g., web pages, images, word processing documents, PDF files movie files, music files, or other computer files). In an embodiment, the origin server 180 is not required such that a compute server can respond to a request without querying an origin server.

The control server 185 is operated by the cloud computing platform and provides a set of tools and interfaces for a customer to, among other things, configure actors to be run in the cloud computing platform. The third-party device 190 is a computing device (e.g., laptop, workstation, smartphone, mobile phone, tablet, etc.) that is used by third parties such as a customer to, among other things, interact with the control server 185. For instance, the control server 185 may allow the customer to indicate how the data is to be split into one or more units.

The customer can split the data into units that tend to be accessed by the same client or sets of clients. This allows the actor to naturally migrate to near where the client(s) are accessing the data thereby providing fast, low-latency access. The following are examples of how the data can be split. If the customer is providing a collaborative document editing system, each document of the system may be a separate actor. If the customer is providing an online gaming service, each game session may be a separate actor. For an online email service, each user's mailbox may be a separate actor. For a calendar service, each user's calendar may be a separate actor. For a team chat product, each channel may be a separate actor.

The control server 185 may allow the customer to upload one or more actor scripts and specify when the actor script(s) are to be run. For instance, the customer may associate a rule that indicates when an actor script is to be run. By way of example, the control server 185 may allow the customer to configure a URL matching pattern that indicates the URL(s) for which the actor script is to run. The control server 185 may allow the customer to delete and update previously uploaded actor script(s).

In an embodiment, the control server 185 deploys each actor script to each of the compute servers 120A-N automatically (without the customer selecting which of the compute servers 120A-N in which to deploy the actor script). In another embodiment, the control server 185 allows the customer to indicate which of the compute servers 120A-N are to be deployed to a particular actor script. The control server 185 creates an identifier for each unique actor script. In an embodiment, the identifier is created by hashing the content of the actor script (e.g., using a cryptographic hash function such as SHA-256), where two scripts with identical content will have the same identifier even if uploaded by different customers and even if applied to different zones.

Figure 2:
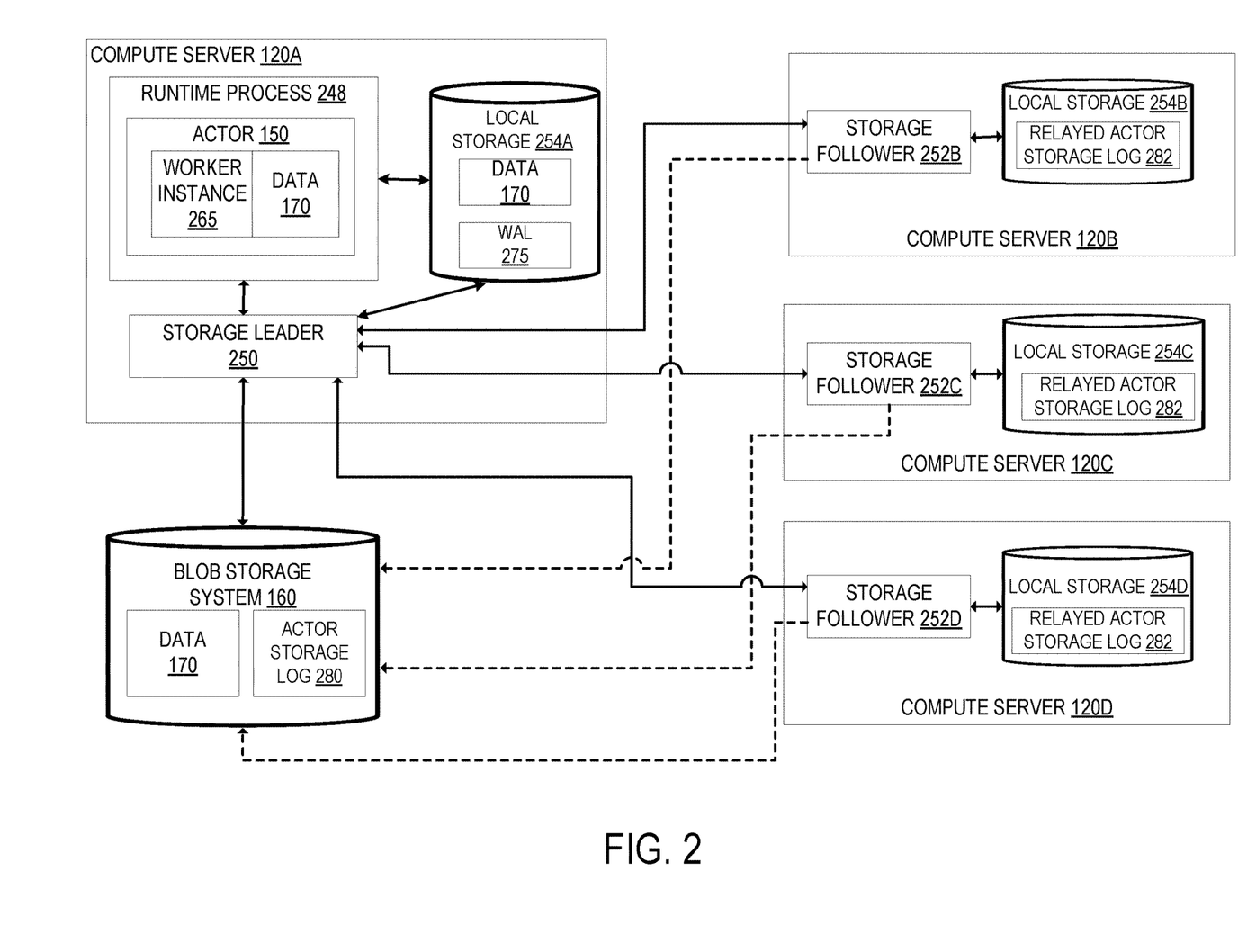
FIG. 2 illustrates a system for state management and persistent data storage in a distributed cloud computing network according to an embodiment.

FIG. 2 illustrates a system for persistent data storage in a distributed cloud computing network according to an embodiment. The actor 150 includes an actor script instance ("actor instance") 265, which is an instantiated actor script, and the data 170. The runtime process 248 may be a runtime sandbox (an isolated execution environment) such as an isolate of the V8 JavaScript engine. The isolated execution environment can be run within a single process. The data 170 is private and persistent data that only the actor instance 265 can read and/or modify and which no other actor can directly access. Thus, the actor instance 265 controls reading and/or writing to the data 170. Other entities that wish to interact with the data send messages to the actor that owns the data. The actor 150 is executed in the runtime process 248.

The actor 150 interacts with the data 170 on local storage of the compute server 120A (e.g., the local storage 254A). The runtime process 248 receives a file descriptor for the local file thereby allowing it to perform direct, synchronous disk I/O directly within the thread that runs the application code (the actor instance 265). Changes to the data 170 (e.g., writes to the data 170) are first recorded in a log file such as the write-ahead logging (WAL) file 275. Changes to the data 170 are further periodically persistently located in storage (e.g., blob storage) external to the compute server 120A, such as the blob storage system 160. Thus, the actor 150 accesses the data 170 as if it lived entirely on local storage and all changes to the persistent data are pushed back to a back-end storage. The local storage is generally faster than the external storage.

Writes to the data 170 are relayed to a set of one or more follower compute servers and periodically sent to the external blob storage system 160. For example, updates to an actor storage log are relayed to the set of one or more follower compute servers. An actor storage log may include data written to the WAL and include additional data. For example, the actor storage log for a particular actor can include data for multiple WALs (e.g., if the actor has multiple databases), data that is not in a WAL format such as a queue, data indicating the initial content of the database before the WAL is created, and data indicating that a checkpoint occurred. The data in the actor storage log may include data back to the last snapshot to be able to restore from the snapshot and not just the last checkpoint. As described in greater detail later herein, the actor storage log may store this data as a sequence of frames.

The compute server 120A includes the storage leader 250 that coordinates the relaying of data. The storage leader 250 selects the set of follower compute servers. In the example of FIG. 2, the compute server 120B. the compute server 120C, and the compute server 120D are selected as follower compute servers. The compute servers 120B, 120C, and 120D include the storage follower 252B, the storage follower 252C, and the storage follower 252D, respectively. The number of follower compute servers is exemplary and there may be fewer or more follower compute servers. The follower compute server(s) may be in another data center or availability zone.

The storage leader 250 selects the set of follower compute server(s). The selected set of follower compute servers may be selected for resiliency such that it is unlikely that multiple follower compute servers will fail at the same time. In such a case, the selected follower compute servers may be in another data center or availability zone. The selected set of follower compute servers may be selected for performance (e.g., reduced latency) such that the selected follower compute servers are located in the same data center. In an embodiment, the storage leader 250 selects one or more data centers (which each include multiple compute servers) and another service selects compute server(s) within the selected data center(s). The selection of the compute server(s) within a data center can be done using a random selection, a round-robin selection, compute resource availability selection, or other selection. Each follower compute server starts a storage follower 252.

The leader-follower system allows writes to be confirmed before they have reached the external storage (e.g., the blob storage system 160). When a write occurs to the WAL file 275 for the data 170, the runtime process 248 notifies the storage leader 250. The storage leader 250 forwards the write to the storage followers (e.g., the storage followers 252B, 252C, and 252D). The storage followers (e.g., the storage followers 252B, 252C, and 252D) store the received information on their own respective local storage. For example, the storage follower 252B stores received write information (updates to the relayed actor storage log 282) on the local storage 254B, the storage follower 252C stores received write information (updates to the relayed actor storage log 282) on the local storage 254C, and the storage follower 252D stores received write information (updates to the relayed actor storage log 282) on the local storage 254D.

A storage follower 252, after writing the received data from the storage leader 250 to its local storage, transmits an acknowledgement of the write to the storage leader 250. After the storage leader 250 receives such an acknowledgement from a quorum of storage followers, the storage leader 250 confirms the write to the requester, even if that write has not itself been confirmed at the external storage (the blob storage system 160). If the storage leader 250 does not receive such an acknowledgement from a quorum of storage followers, the storage leader 250 may determine that the write has failed. The storage leader 250 may retry and/or select new followers before determining that the write has failed. The quorum of storage followers may be more than half of the storage followers.

Periodically, the storage leader 250 transmits write information to the external storage (e.g., the blob storage system 160). For example, the leader may collect writes into batches to periodically transmit to the external storage. The period may be based on a timer and/or based on reaching a threshold of queued data. The storage leader 250 receives a confirmation from the eternal storage upon the writes completing successfully. After receiving this confirmation, the storage leader 250 transmits a write confirmation notice to the storage followers (e.g., the storage followers 252B, 252C, and 252D).

After a storage follower 252 receives this write confirmation notice from the storage leader 250, the storage follower 252 can discard the data written to its local storage. Thus, each storage follower 252 holds onto the data in its local storage until it receives a notification from the storage leader 250 that the write has completed to external storage. If a storage follower 252 fails to receive such a write confirmation notice within a certain timeout, or if the storage follower 252 detects that the storage leader 250 has failed (e.g., the compute server that is executing the storage leader 250 cannot be contacted), the storage follower 252 transmits the data to the external storage directly.

The lifetime of the execution of a particular actor from when the instance is started to when it is shut down can be referred to as a session. In an embodiment, each change to an actor storage is described by a frame. The actor storage log is essentially a sequence of frames. Each frame has a session number and a frame sequence number, and applies to a particular lane. A lane can be a separate logical file (e.g., a separate SQLite database, a separate queue) used by a single actor. One actor can have multiple lanes (and thus multiple logical files such as multiple databases (and corresponding WAL files) and/or queues). There are different types of frames including a new lane frame, a delete lane frame, a write frame, a checkpoint frame, a consume frame, and an initialize frame. The new lane frame establishes a new named lane. Such a frame includes the lane name, index, and type descriptor. The delete lane frame deletes an existing lane thereby discarding all its data. A write frame writes bytes at a given offset in the lane's main file (e.g., a WAL file). A checkpoint frame indicates that a full checkpoint has occurred, allowing the WAL file to reset. A consume frame is for a queue lane, and updates the queue start marker after a message at the front of the queue has been consumed. An initialize frame indicates that a fresh database was initialized. The initialize frame includes the complete content of the initial database file.

Periodically, the storage leader 250 may perform a snapshot which includes uploading a complete snapshot of the data from the local storage (e.g., the local storage 254A) to the external storage (e.g., the blob storage system 160). Prior to performing the snapshot, a checkpoint operation may be performed to backfill data from the WAL file 275 to the main database file (e.g., the data 170). After such a checkpoint operation is complete, the content of the database file is uploaded as part of the snapshot. If the WAL file 275 is not empty, the snapshot includes the content of the WAL file 275. After performing the snapshot, the storage leader 250 can delete older snapshots and session logs.

If a storage follower 252 is determined to have stopped operating or is not keeping up with the writes, the storage leader 250 may replace that storage follower 252. To replace a storage follower, the storage leader 250 selects a new follower, connects to it, and replays all pending write information starting from the data that was last confirmed by the external blob storage system (e.g., the blob storage system 160). Once the new follower reaches the point of confirming its first commit, the store leader formally replaces the follower in the session state.

The external blob storage system (e.g., the blob storage system 160) stores the persistent data and other metadata. For instance, the blob storage system 160 stores the data 170 and the actor storage log 280. The actor storage log 280 can be stored in a series of batches, each batch being one blob. For instance, the blob storage system 160 can store a log batch, a resignation batch, session state, and/or snapshot information.

The log batch, which may be stored for each piece of persistent data (identified by an identifier for the actor) and session (identified by session number), contains a sequence of frames that end at a given frame number. Each batch can start with the previous end frame. The last known frame number can be determined by checking the session state and/or the storage followers 252. The session state indicates whether the session ended cleanly and if so, the last frame number. If the session state indicates that the session is open, the storage followers are contacted to determine the last confirmed frame. The session numbers are encoded in such a way that a forward list operation lists the sessions in reverse order. The first session returned in lexical order is the most-recent session.

The resignation batch has the same format as the log batch but represents a sequence of frames dumped by a follower after it lost contact with the leader. A storage follower writes a resignation responsive to determining to leave the session before the storage leader indicates the session is finished.

The session state contains the state of a given session (identified by actor and session number). The session state can include: starting (a leader has claimed ownership of a session and is selecting followers); running (the followers have been selected and the session is running); ended (the leader has ended the session); frozen (a new leader is attempting to take ownership of the actor but an old leader is running); and terminated (the session was ended by a quorum of followers). The snapshot includes the raw content of the actor's storage as of a particular session and frame number.

The storage of the data on the server executing the actor 150 (e.g., on the local storage 254A) can take the form of a database (e.g., a SQLite database) and a log file (e.g., a WAL file). This server may also store a queue file that contains a sequence of messages for a session for an actor. This server may also store data that indicates whether an actor was cleanly closed at the end of the session.

When the actor 150 disconnects from the storage leader 250 (e.g., it has completed processing), the storage leader 250 performs a shutdown process. The storage leader 250 gathers any remaining write information and transmits them to the blob storage system 160. It will disregard any writes that were not committed. The storage leader 250 updates the session state to indicate that a clean shutdown occurred and stores the end frame number in the state. After closing the session, the storage leader 250 may asynchronously upload a final snapshot to the blob storage system 160. The storage leader 250 may write a marker to the local storage 254A that indicates that a clean shutdown occurred that allows a future storage leader executing on the same compute server that it is safe to reuse the files already on disk rather than download the last snapshot from the blob storage system 160.

If a storage follower 252 receives an indication that the storage leader 250 has disconnected (e.g., it has failed unexpectedly), the storage follower 252 checks whether the storage leader 250 had sent a commit to it without sending a follow-up confirmation of writes to the blob storage system 160. If this is the case, the storage follower 252 collects all frames between the last confirmation and the last commit into a resignation batch that is then uploaded to the blob storage system 160. Each resignation may be marked with the follower number it came from and the frame number it ends at, so that a future storage leader can determine which followers have already exited and what frames are available.

Figure 3:
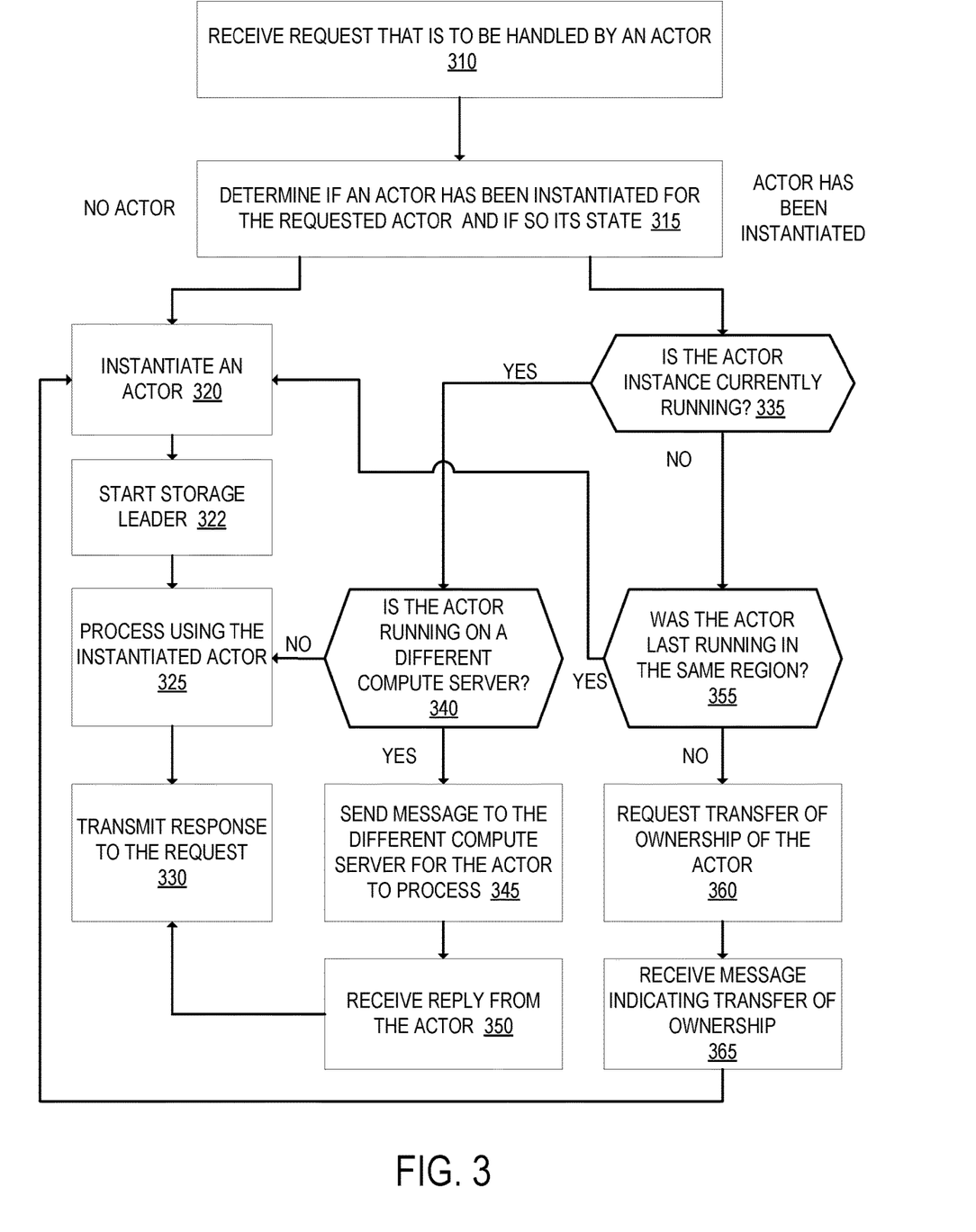
FIG. 3 is a flow diagram that illustrates exemplary operations for actor processing according to an embodiment.

FIG. 3 is a flow diagram that illustrates exemplary operations for actor processing according to an embodiment. The operations of FIG. 3 will be described with respect to HTTP/S requests and responses. However, the operations of FIG. 3 can be performed with different types of requests and responses.

At operation 310, a first one of multiple compute servers of a distributed cloud computing network receives a request that is to be handled by an actor. This request may be received from a client device (e.g., the compute server 120A receiving a request from the client device 110), from a piece of code executing on the first compute server that is triggered by a request received from a client device, from a different actor, or from an internal event such as a scheduled job. The request may be an HTTP request, HTTPS request, or other protocol request. The compute server may determine that the request is to be handled by an actor by a script that determines an actor ID and forwards the request to the appropriate instance of the actor script. In another embodiment, this determination is made by analyzing the request URL against a URL matching pattern configured for the zone to determine if an actor is to handle the request. To provide an example, the HTTP request is an HTTP GET method for "example.com/object/1234", which matches a predefined matching pattern for determining that an actor is to handle the request.

The distributed cloud computing network includes multiple compute servers including the first compute server. The compute servers are geographically distributed, and there may be hundreds or more compute servers. In an embodiment, the distributed cloud computing network uses anycast such that a particular group of compute servers (e.g., connected to the same router of a data center) receives a request because it is the closest to the requesting client device according to an anycast implementation. Which of the group of compute servers processes the request may be determined by the router that receives the request (e.g., according to an equal cost multipath routing mechanism). Thus, the first compute server may receive the request in operation 310 because the first compute server is part of a group of servers that is the closest to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to the group.

Next, at operation 315, the first compute server determines whether an actor has been instantiated for the requested actor (e.g., identified by an actor identifier) and if so, the state of the actor instance. For example, the first compute server may use a directory service to determine this information. The state information may indicate the location, if any, in which the actor instance is running. For instance, the directory service may indicate an identifier of the compute server that is running the actor instance. The directory service may also indicate the last region in which the requested actor was running. A region is a group of compute servers that may be geographically near each other. If an actor has not been instantiated, then operation 320 is performed. If an actor has been instantiated, then operation 335 is performed.

The directory service may use a distributed hash table. As another example, a replicated service using eventual consistency may be used. Yet another example, a hierarchical directory where the directory service for any given actor is another actor that is identified from the actor's ID may be used. Yet another example, the backing blob storage system itself may be used as the directory service by storing a file adjacent to the data and performing optimistic-concurrency transactions.

At operation 320, the first compute server instantiates an actor. Instantiating the actor may include retrieving the persistent data from storage or from its origin server, and/or retrieving the actor script from storage or from its origin server. Instantiating the actor includes registering the actor with the directory service (e.g., indicating that the actor is executing on the first compute server). Instantiating the actor may include determining what entity is going to execute the actor instance. In an embodiment, the first compute server is determined to execute the actor instance because it is the one that received the request in operation 320. However, in an embodiment where policy is applied, the first compute server first determines whether policy allows for the actor instance to be executed at the first compute server. The policy may be associated with the actor and/or the requesting user. For instance, the first compute server may access a policy associated with the actor identified by the request and/or a policy associated with the requesting user. There may be one or more policies that are applicable to the actor. The one or more policies specify the condition(s) in which an actor can be instantiated and/or where the actor can be instantiated. The actor instantiation policy may specify location(s) in which the actor is allowed and/or not allowed to be instantiated, times in which the actor is allowed and/or not allowed to be instantiated, characteristic(s) of the server and/or data center in which the actor is allowed and or not allowed to be instantiated, location(s) of client devices that are allowed and/or not allowed to cause the actor to be instantiated, and/or characteristic(s) of client devices that are allowed and/or not allowed to cause the actor to be instantiated. If policy does not allow for the actor to be instantiated at the first compute server, then the first compute server may reject the request if policy does not allow for the actor to be instantiated at the first compute server. For instance, if the first compute server is in a jurisdiction that is not allowed to instantiate the actor, the first compute server may reject the request. As another exemplary alternative action, the first compute server may determine whether any other compute server of the distributed cloud computing network is permitted by policy to instantiate the actor, and if so, cause one of those compute servers to instantiate the actor. In such a case, the first compute server may transmit the request to another compute server for processing the request or redirect the client to issue the request to another compute server for processing.

Next, at operation 322, a storage leader 250 is started. In an embodiment, the storage leader 250 attempts to become the owner of the actor. The storage leader 250 may query the external blob storage system (e.g., the blob storage system 160) for state information, if any, for the actor, such as the previous session number and previous session state. It is possible for a previous session to be still running at the time the storage leader 250 attempts to become the owner of the actor. If the previous session is still running, the storage leader 250 takes actions to become owner of the actor. For example, the storage leader 250 freezes the session to prevent the previous leader from making any further changes to the session state (e.g., changing the list of followers). The storage leader 250 may determine which followers, if any, have relayed their write information to the external blob storage system. The storage leader 250 may contact each follower, if any, that has not relayed their write information to the external blob storage system to disconnect from the previous leader and relay the write information to the external blob storage system. After a quorum of followers have relayed the write information to the external blob storage system, the storage leader 250 can determine the latest frame number that the followers have reported. The storage leader 250 then updates the previous session state to indicate that it has been terminated and at what frame number the termination occurred. After the previous session is closed, the storage leader 250 initializes the session state for the new session in the external blob storage system.

The storage leader 250 selects a set of one or more follower compute servers. The follower compute server(s) may be in another data center or availability zone. Each follower compute server starts a storage follower 252.

Next, at operation 325, the instantiated actor processes the code, which may include reading and/or writing to the persistent data that belongs to the actor. Operations that occur when reading persistent data are described with respect to FIG. 4. Operations that occur when writing to the persistent data are described with respect to FIG. 5. As described with respect to FIG. 5, if processing the request includes writing to the persistent data, the write(s) are replicated to the storage follower(s). At operation 330, the first compute server transmits a response to the request (e.g., to the requesting client device).

Referring back to operation 315, if an actor has been instantiated, at operation 335 the first compute server determines, from the state information of the actor, whether the actor is currently running. If the actor is not currently running, then operation 355 is performed. If the actor is currently running, then at operation 340 the first compute server determines, from the state information of the actor, whether the actor is running on a different compute server. If the actor is not running on a different compute server (meaning it is running on the first compute server), then operation 325 is performed. If the actor is running on a different compute server, then operation 345 is performed.

At operation 345, the first compute server sends a message to the different compute server for the actor to process. This message may be the request that is received in operation 310, for example. The different compute server processes the request, which may include reading from the persistent data and/or writing to the persistent data. At operation 350, the first compute server receives a reply from the actor on the different compute server in response to the request. Then, at operation 330, the first compute server transmits a response to the request to the requesting client device.

The compute servers may be logically separated into regions. A network partition may exist or come into existence between regions that affects communication between regions (e.g., a complete communication block or very slow communication). In an embodiment, an actor can run in only a single region at a time. In an embodiment, because a controlling actor is to run in only a single location, a determination is made whether the actor was last running in a different region as the compute server and if it was, a transfer of ownership must occur. This prevents a compute server in one region from running the actor concurrently with a compute server in a different region. Thus, at operation 355, the first compute server determines, from the state information of the actor, if the actor was last running in the same region as the first compute server. If the actor was last running in the same region as the first compute server, then operation 320 is performed where the first compute server instantiates the actor. If, however, the actor was last running in a different region as the first compute server, then operation 360 is performed where the first compute server requests a transfer of ownership of the actor from that different region to the region of the first compute server. The first compute server may transmit a message to the compute server that is currently listed in the directory service as owning the actor that requests transfer of ownership of the actor.

In an embodiment, the transfer of ownership may be denied. In such a case, the other compute server may instantiate the actor. The first compute server may then transmit a message to that compute server for the actor to process like in operation 345.

In an embodiment, if the first compute server does not receive a response to the requested transfer (e.g., a network partition has prevented communication between the regions), then the first compute server does not instantiate the actor and process the request. In such a case, the first compute server may transmit an error message to the requester.

If transfer of ownership to the first compute server is agreed upon, then the first compute server receives a message indicating transfer of ownership at operation 365. The first compute server then instantiates an actor at operation 320.

In an embodiment, the actor is automatically migrated to be close to the entities with which it commonly communicates. This automatic migration may be a natural consequence of a compute server receiving a request that is to be handled by an actor and that actor is not currently instantiated (even if it was last running on a different compute server). As another example, the actor may be automatically migrated based on a set of one or more parameters.

For instance, the system may track the origination of the requests (e.g., compute server and/or region) over a period of time and automatically migrate the actor to the originator with the highest number of requests. To track the origination of the requests, a compute server that receives a request that is to be handled by an actor causes a request received number to be incremented. The request received number may be stored in the directory service, for example. A number for the particular compute server and/or an aggregate number for the region may be incremented.

As another example, the system may determine the location of the actor (e.g., which compute server or region) that has the minimum total latency and automatically migrate the actor to that location. The minimum total latency may be determined by analyzing the latency to process each request (which may be determined with network probes). For instance, statistics may be gathered on the locations where requests are originating and a determination of the optimal location in which to serve the traffic is made based on the statistics. In an embodiment, this determination is performed by measuring the latency from each compute server or region to each client, computing the average latency weighted by the amount of traffic (e.g., the number of requests) each of those clients sent, and selecting the compute server or region that has the lowest average. In another embodiment, this determination is made by plotting the clients location on a map, computing the average latency weighted by the amount of traffic (e.g., the number of requests) between the locations, and then selecting the closest compute server or region to that average. As another example, the system may determine the location of the actor (e.g., the location of the compute server or region) that has the minimum total of the squares of the latency.

As another example, the system may automatically migrate the actor based on historical and/or predicted requests to be handled by the actor. As another example, the system may automatically migrate the actor based on which compute server or region ingresses the most total traffic for that actor.

Figure 4:
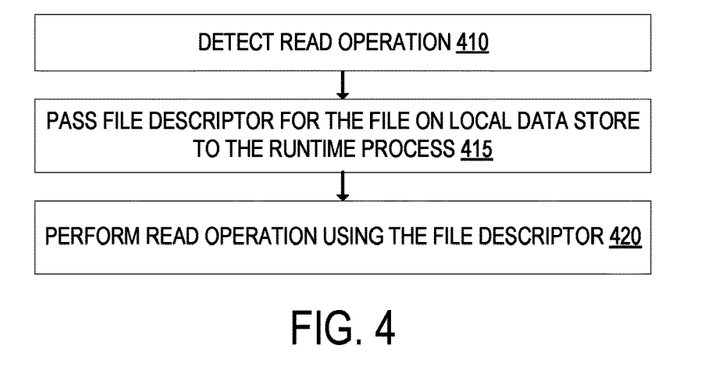
FIG. 4 is a flow diagram that illustrates exemplary operations for processing the request including reading the persistent data according to an embodiment.
Figure 5:
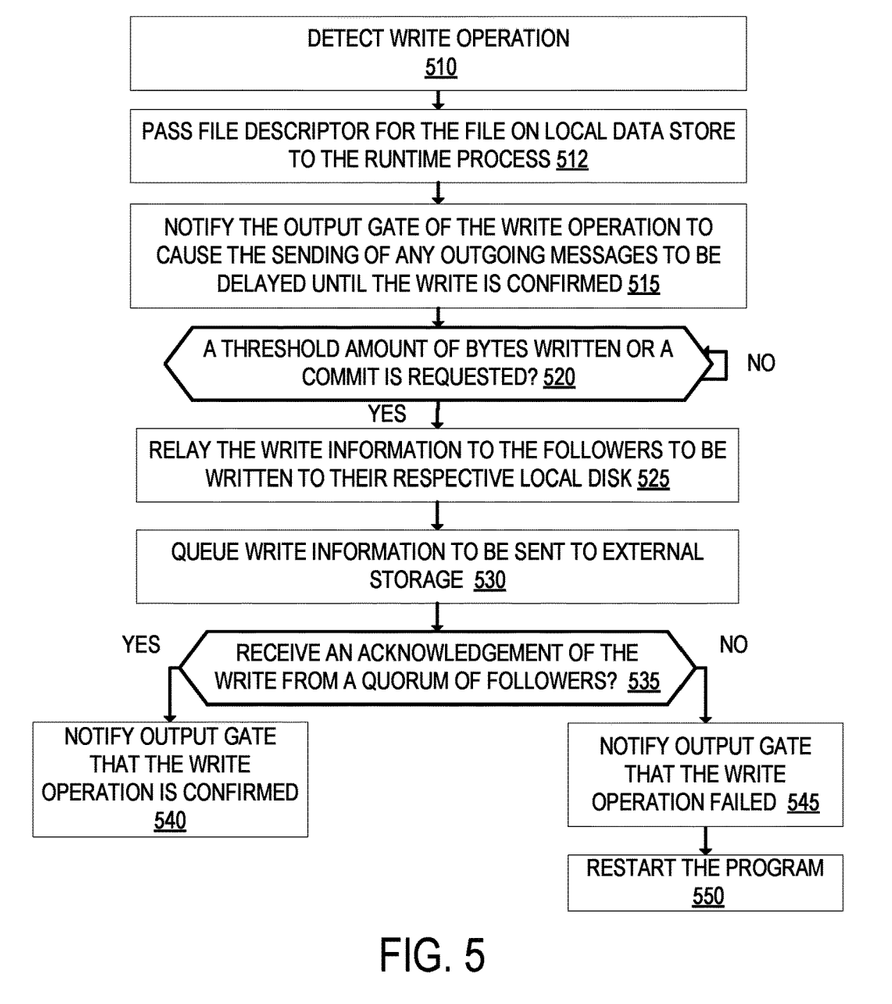
FIG. 5 is a flow diagram that illustrates exemplary operations for processing the request including writing to the persistent data according to an embodiment.

FIG. 4 is a flow diagram that illustrates exemplary operations for processing the request including reading the persistent data, according to an embodiment. FIG. 5 is a flow diagram that illustrates exemplary operations for processing the request including writing to the persistent data, according to an embodiment. The operations of FIG. 4 and/or FIG. 5 may be performed in operation 325.

At operation 410, a read operation to read from the persistent data is detected. If the persistent data is not in local storage, the persistent data is retrieved from external storage or from its origin server. Next, at operation 415, the storage leader 250 passes the file descriptor for the local file to the runtime process 248 which can then perform direct, synchronous disk I/O for the file. Next, at operation 420, the read operation is performed using the file descriptor. After the read operation is performed (and assuming no other operations) then flow moves from operation 325 to operation 330, where the first compute server transmits a response to the request (e.g., to the requesting client device).

With respect to FIG. 5, at operation 510, a write operation to write data to the persistent data is detected. If the persistent data is not in local storage, the persistent data is retrieved from external storage or from its origin server. Next, at operation 512, the storage leader 250 passes the file descriptor for the local file to the runtime process 248 which can then perform direct, synchronous disk I/O for the file.

Next, at operation 515, the application notifies the output gate of the write operation to cause the sending of any outgoing messages from the actor 150 to be delayed until the write is confirmed. The output gate is a piece of code that controls the flow of messages (e.g., outgoing messages) out of the application such as the actor 150. The output gate is either part of the actor 150 or is associated with the actor 150 through which all outgoing messages must pass. An outgoing message may be any output including an HTTP/S request, an HTTP/S response, audio, video, etc. The outgoing message is destined to a destination external to the actor 150. The output gate defers the transmission of any new outgoing network messages from the actor 150 to an external entity (a destination external to the actor 150 such as to another server, another actor (which can be running on the same server or a different server), or other objects implemented by the same application) until a pending storage write operation has been confirmed. If the write fails, the outgoing network messages are discarded and replaced with errors and the actor 150 is shut down and restarted. This allows the actor 150 to continue executing concurrently with a storage write without running the risk of data loss after confirmation (by preventing other parties from being falsely informed that the data was stored). To the actor 150, it appears as if the write operation finishes relatively instantly even though the actual write operation may not be completed (or even complete) and the actor can continue to execute code. However, outgoing network messages are prevented from being sent until the write operation is complete. Thus, the actor can assume the storage write operation succeeded and continue executing the code. Thus, in the rare event that a write operation fails, a premature confirmation of a successful write operation is not received by external entities. This means that although the write is assumed to be confirmed, no other entity will receive that confirmation until the write is confirmed. In the meantime, the actor can execute other code concurrently that it would otherwise have had to wait to run for the confirmation that the storage write completed. Thus, the output gate allows the application to continue execution in parallel with the write being synced to disk without the risk of prematurely confirming a failed write to external parties. To an external client (e.g., the client that caused the actor to be instantiated), overall latency is lower than a conventional blob storage operation would allow.

When a threshold amount of bytes have been written to the local storage or in some embodiments an actor storage commit is requested, the storage leader 250 relays the write information to the set of followers. An actor storage commit may be requested when the application has returned control to the event loop after performing one or more write operations. For example, the actor system promises that any write operations performed with no intervening input/output will be committed atomically. When the application has completed a set of one or more atomic write operations, the application sends an actor storage commit request to the storage leader 250. Thus, at operation 520, if a threshold amount of bytes have been written to the local storage or an actor storage commit is requested, then operation 525 is performed where the storage leader 250 relays the write information to the set of followers which in turn are to write to their respective local disk. If a threshold amount of bytes have not been written to the local storage or an actor storage commit is not requested, then the storage leader 250 waits until the threshold amount of bytes have been written to the local storage or an actor storage commit is requested. The storage leader 250 may gather the writes into a set of log entries (e.g., frames or transaction records) for transmission to the storage followers. In an example, a write frame may be transmitted to the set of followers.

Figure 6:
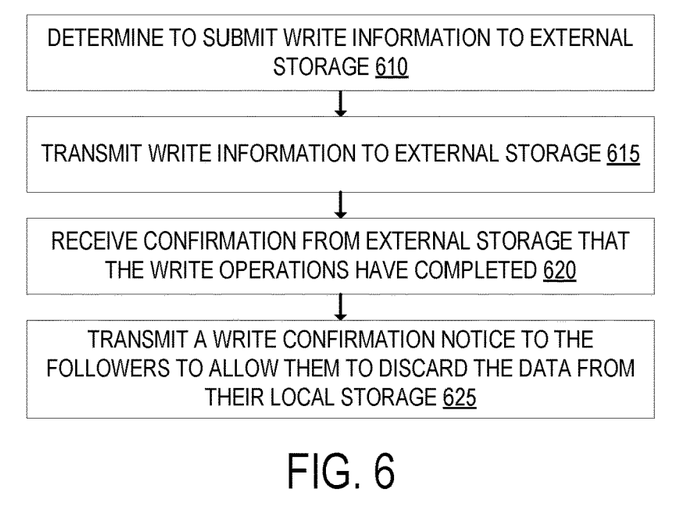
FIG. 6 is a flow diagram that shows exemplary operations for transmitting the write information to the external storage according to an embodiment.

At operation 530, the storage leader 250 queues the write information to be sent to the external storage (e.g., the blob storage system 160). For example, the storage leader 250 may collect writes into batches to periodically transmit to the external storage. The period may be based on a timer and/or based on reaching a threshold of queued data. FIG. 6 is a flow diagram that shows exemplary operations for transmitting the write information to the external storage.

At operation 535, the storage leader 250 determines whether it has received an acknowledgement of the write from a quorum of the set of followers. The quorum may be more than half of the set of followers. An acknowledgment from a storage follower represents that the relayed actor storage log has been updated with the log entry received from the storage leader 250. If the storage leader 250 receives an acknowledgement of the write from a quorum of the set of followers, then operation 540 is performed. If the storage leader 250 does not receive an acknowledgement of the write from a quorum of the set of followers, then operation 545 is performed. Prior to proceeding to operation 545, the storage leader 250 may retry and/or select new followers before determining that the write has failed.

At operation 540, the storage leader 250 notifies the output gate that the write operation is confirmed, which allows any pending outgoing message related to the actor to be transmitted.

At operation 545, the storage leader 250 notifies the output gate that the write operation has failed. This notification may be in the form of the leader terminating itself which closes the socket between the runtime process 248 and the storage leader 250. The runtime process 248 understands the failure and removes the output gate. Any outgoing queued message(s) related to the actor are then discarded. They may be replaced with errors. At operation 550, the actor is shut down and may be restarted.

With reference to FIG. 6, at operation 610, the storage leader 250 determines to submit write information to the external storage (e.g., the blob storage system 160). The storage leader 250 may collect writes into batches to periodically transmit to the external storage. The period may be based on a timer and/or based on reaching a threshold of queued data. The storage leader 250 can batch the frames for writing to the external storage as a single blob. The batch may begin and end at a commit boundary. Next, at operation 615, the storage leader 250 transmits the write information to the external storage.

If the writes to the external storage completes successfully, the storage leader 250 will receive a confirmation of the successful write from the external storage. Thus, at operation 620, the storage leader 250 receives a confirmation from the eternal storage upon the writes completing successfully. After receiving this confirmation, at operation 625, the storage leader 250 transmits a write confirmation notice to the storage followers (e.g., the storage followers 252B, 252C, and 252D). This allows the storage followers to discard the data of the write in their local storage.

Figure 7:
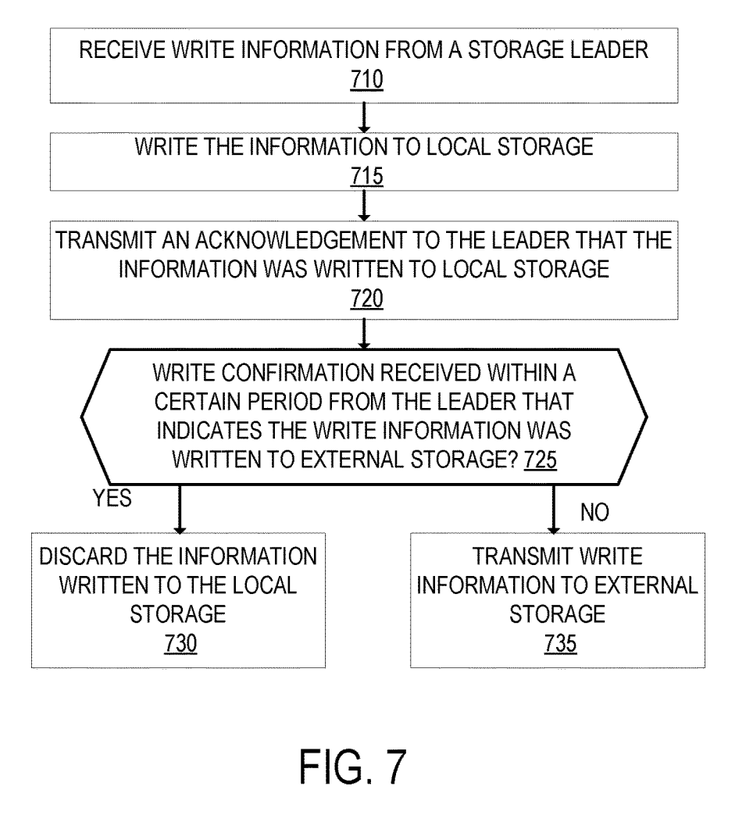
FIG. 7 is a flow diagram that illustrates exemplary operations performed at a storage follower according to an embodiment.

FIG. 7 is a flow diagram that illustrates exemplary operations performed at a storage follower according to an embodiment. At operation 710, the storage follower receives write information from a storage leader. For example, the storage follower 252B receives write information from the storage leader 250. The write information may be a log entry representative of a write operation. As an example, a write frame may be received from the storage leader 250. The write information may be received because of operation 525 being performed.

At operation 715, the storage follower writes the information to its local storage. For example, the storage follower 252B stores the write information in the relayed actor storage log 282 of the local storage 254B. Next, at operation 720, the storage follower transmits an acknowledgement to the storage leader 250 that the write information has been stored.

The storage follower may store the data until it receives a notification from the storage leader 250 that indicates that the information has successfully been written to the external storage. After receiving such a notification, the storage follower can discard the data. If the storage follower does not receive such a notification within a certain time, or if it otherwise detects that the storage leader has failed, the storage follower can itself write the data to the external storage.

At operation 725, the storage follower determines whether a write confirmation has been received from the storage leader 250 within a certain period that indicates that the write information was written to the external storage. If such a write confirmation is received, then operation 730 is performed where the storage follower discards the information written to the local storage. The storage follower may delete, or mark for deletion, the information in the local storage.

If such a write confirmation is not received within a certain time, or if the storage follower detects that the storage leader 250 has failed, then operation 735 is performed. At operation 735, the storage follower 252 transmits the write information for which it has not received a write confirmation to the external storage. Thus, if the storage follower 252 fails to receive a write confirmation notice with a certain timeout, or if the storage follower 252 otherwise detects or receives notice that the storage leader 250 has failed, the storage follower 252 transmits the write information to the external storage directly.

Figure 8:
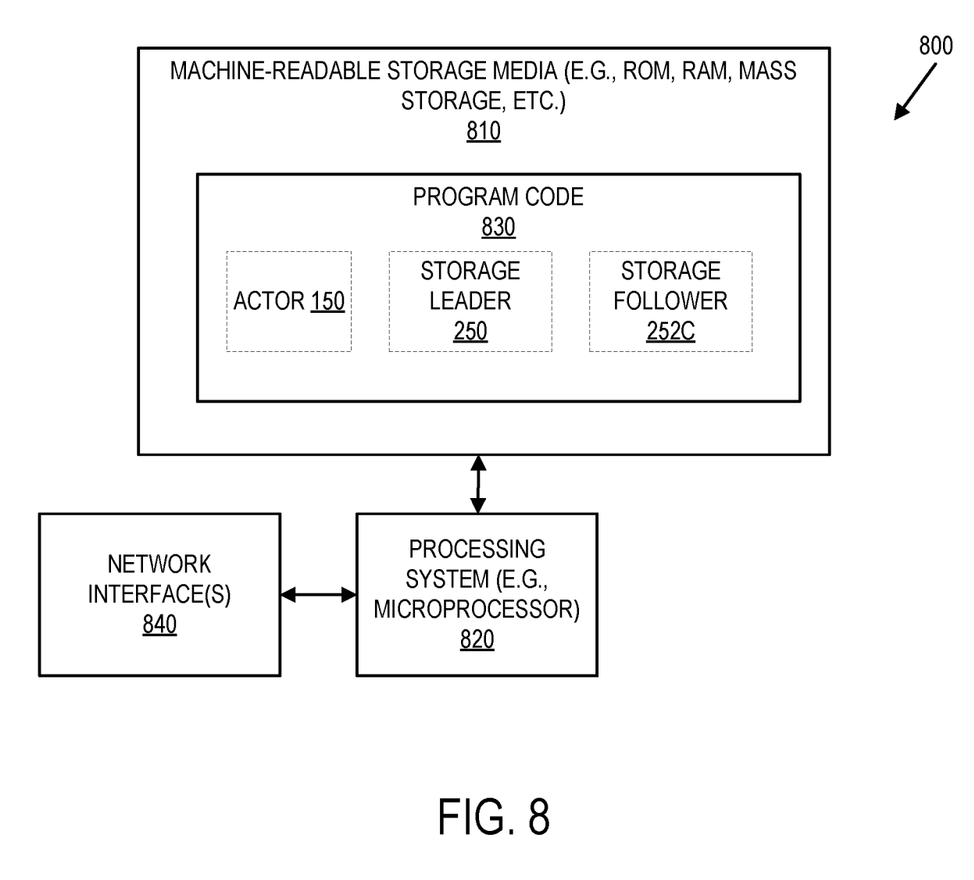
FIG. 8 is a block diagram illustrating a data processing system that can be used in an embodiment.

FIG. 8 illustrates a block diagram for an exemplary data processing system 800 that may be used in some embodiments. One or more such data processing systems 800 may be utilized to implement the embodiments and operations described with respect to the compute servers and/or client devices. Data processing system 800 includes a processing system 820 (e.g., one or more processors and connected system components such as multiple connected chips).

The data processing system 800 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 820. For example, the depicted machine-readable storage media 810 may store program code 830 that, when executed by the processing system 820, causes the data processing system 800 to execute the actor 150, and/or any of the operations described herein.

The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). Additional components, not shown, may also be part of the system 800, and, in certain embodiments, fewer components than that shown in One or more buses may be used to interconnect the various components shown in FIG. 8.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth. However, it is understood that embodiments may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a first compute server of a plurality of compute servers of a distributed cloud computing network, a request for an application to be executed at the distributed cloud computing network, wherein the application controls reading and writing access to persistent data associated with the application;
determining that a first write operation is triggered by the application for the persistent data;
performing, at the first compute server, the first write operation for the persistent data on local storage of the first compute server;
notifying a piece of code that controls outgoing messages from the application that the first write operation for the persistent data is pending, wherein the piece of code prevents an outgoing message from the application from being transmitted to a destination external to the application until the first write operation is confirmed;
transmitting write information for the first write operation for the persistent data to a set of one or more other compute servers of the distributed cloud computing network;
queuing the write information for the first write operation for the persistent data for transmission to an external blob storage system;
receiving, from a quorum of the set of one or more other compute servers of the distributed cloud computing network, an acknowledgement of the write information that represents that the first write operation has been confirmed;
notifying the piece of code that the first write operation has been confirmed responsive to the receiving the acknowledgement of the write information from the quorum of the set of one or more other compute servers of the distributed cloud computing network;
transmitting the write information for the persistent data to the external blob storage system;
receiving, from the external blob storage system, a confirmation that the write information has successfully been written to the external blob storage system; and
responsive to receiving the confirmation, transmitting a write confirmation notice to the set of one or more other compute servers.

2. The method of claim 1, wherein the first compute server and at least one of the set of one or more other compute servers are located in different data centers.

3. The method of claim 1, wherein performing the first write operation on the local storage of the first compute server includes performing direct, synchronous disk input/output within a thread that runs the application.

4. The method of claim 1, wherein the first write operation for the persistent data is recorded in a write-ahead logging (WAL) file, and wherein the write information for the persistent data transmitted to the set of one or more other compute servers includes an update to the WAL file.

5. The method of claim 1, further comprising:
receiving, from the application at the piece of code, an outgoing message that is destined to a destination external to the application; and
determining that the first write operation is pending, and responsive to this determination, preventing the outgoing message from being transmitted to the destination external to the application until the pending first write operation is confirmed.

6. The method of claim 1, further comprising:
determining that a second write operation is triggered by the application for the persistent data;
performing, at the first compute server, the second write operation for the persistent data on the local storage of the first compute server;
notifying the piece of code that controls outgoing messages from the application that the second write operation for the persistent data is pending, wherein the piece of code prevents an outgoing message from the application from being transmitted to a destination external to the application until the second write operation is confirmed;
transmitting write information for the second write operation for the persistent data to the set of one or more other compute servers of the distributed cloud computing network;
queuing the write information for the second write operation for the persistent data for transmission to an external blob storage system;
receiving, from the application at the piece of code, an outgoing message that is destined to a destination external to the application; and
determining that an acknowledgement of the write information for the second operation is not received at the first compute server from at least a quorum of the set of one or more other compute servers, and responsive to this determination, notifying the piece of code that the second write operation has failed and preventing the outgoing message from being transmitted to the destination external to the application.

7. The method of claim 1, further comprising:
determining that a read operation is triggered by the application for the persistent data; and
reading the persistent data from local storage of the first compute server.

8. A first compute server of a plurality of compute servers of a distributed cloud computing network, the first compute server comprising:
a processor; and
a non-transitory machine-readable storage medium coupled to the processor, wherein the non-transitory machine-readable storage medium stores instructions that, when executed by the processor, executes software code including:
receiving, at the first compute server of the distributed cloud computing network, a request for an application to be executed at the distributed cloud computing network, wherein the application controls reading and writing access to persistent data associated with the application;
determining that a first write operation is triggered by the application for the persistent data;

performing, at the first compute server, the first write operation for the persistent data on local storage of the first compute server;

notifying a piece of code that controls outgoing messages from the application that the first write operation for the persistent data is pending, wherein the piece of code prevents an outgoing message from the application from being transmitted to a destination external to the application until the first write operation is confirmed;

transmitting write information for the first write operation for the persistent data to a set of one or more other compute servers of the distributed cloud computing network;

queuing the write information for the first write operation for the persistent data for transmission to an external blob storage system;

receiving, from a quorum of the set of one or more other compute servers of the distributed cloud computing network, an acknowledgement of the write information that represents that the first write operation has been confirmed;

notifying the piece of code that the first write operation has been confirmed responsive to the receiving the acknowledgement of the write information from the quorum of the set of one or more other compute servers of the distributed cloud computing network;

transmitting the write information for the persistent data to the external blob storage system;

receiving, from the external blob storage system, a confirmation that the write information has successfully been written to the external blob storage system; and responsive to receiving the confirmation, transmitting a write confirmation notice to the set of one or more other compute servers.

9. The first compute server of claim 8, wherein the first compute server and at least one of the set of one or more other compute servers are located in different data centers.

10. The first compute server of claim 8, wherein performing the first write operation on the local storage of the first compute server includes performing direct, synchronous disk input/output within a thread that runs the application.

11. The first compute server of claim 8, wherein the first write operation for the persistent data is recorded in a write-ahead logging (WAL) file, and wherein the write information for the persistent data transmitted to the set of one or more other compute servers includes an update to the WAL file.

12. The first compute server of claim 8, wherein the operations further comprise:
receiving, from the application at the piece of code, an outgoing message that is destined to a destination external to the application; and
determining that the first write operation is pending, and responsive to this determination, preventing the outgoing message from being transmitted to the destination external to the application until the pending first write operation is confirmed.

13. The first compute server of claim 8, wherein the operations further comprise:
determining that a second write operation is triggered by the application for the persistent data;
performing, at the first compute server, the second write operation for the persistent data on the local storage of the first compute server;
notifying the piece of code that controls outgoing messages from the application that the second write operation for the persistent data is pending, wherein the piece of code prevents an outgoing message from the application from being transmitted to a destination external to the application until the second write operation is confirmed;
transmitting write information for the second write operation for the persistent data to the set of one or more other compute servers of the distributed cloud computing network;
queuing the write information for the second write operation for the persistent data for transmission to an external blob storage system;
receiving, from the application at the piece of code, an outgoing message that is destined to a destination external to the application; and
determining that an acknowledgement of the write information for the second operation is not received at the first compute server from at least a quorum of the set of one or more other compute servers, and responsive to this determination, notifying the piece of code that the second write operation has failed and preventing the outgoing message from being transmitted to the destination external to the application.

14. The first compute server of claim 8, wherein the operations further comprise:
determining that a read operation is triggered by the application for the persistent data; and
reading the persistent data from local storage of the first compute server.

15. A non-transitory machine-readable storage medium that provides instructions that, when executed by a processor, causes said processor to perform operations comprising:
receiving, at a first compute server of a plurality of compute servers of a distributed cloud computing network, a request for an application to be executed at the distributed cloud computing network, wherein the application controls reading and writing access to persistent data associated with the application;
determining that a first write operation is triggered by the application for the persistent data;
performing, at the first compute server, the first write operation for the persistent data on local storage of the first compute server;
notifying a piece of code that controls outgoing messages from the application that the first write operation for the persistent data is pending, wherein the piece of code prevents an outgoing message from the application from being transmitted to a destination external to the application until the first write operation is confirmed;
transmitting write information for the first write operation for the persistent data to a set of one or more other compute servers of the distributed cloud computing network;
queuing the write information for the first write operation for the persistent data for transmission to an external blob storage system;
receiving, from a quorum of the set of one or more other compute servers of the distributed cloud computing network, an acknowledgement of the write information that represents that the first write operation has been confirmed;
notifying the piece of code that the first write operation has been confirmed responsive to the receiving the acknowledgement of the write information from the quorum of the set of one or more other compute servers of the distributed cloud computing network;

transmitting the write information for the persistent data to the external blob storage system; and receiving, from the external blob storage system, a confirmation that the write information has successfully been written to the external blob storage system; and responsive to receiving the confirmation, transmitting a write confirmation notice to the set of one or more other compute servers.

16. The non-transitory machine-readable storage medium of claim 15, wherein the first compute server and at least one of the set of one or more other compute servers are located in different data centers.

17. The non-transitory machine-readable storage medium of claim 15, wherein performing the first write operation on the local storage of the first compute server includes performing direct, synchronous disk input/output within a thread that runs the application.

18. The non-transitory machine-readable storage medium of claim 15, wherein the first write operation for the persistent data is recorded in a write-ahead logging (WAL) file, and wherein the write information for the persistent data transmitted to the set of one or more other compute servers includes an update to the WAL file.

19. The non-transitory machine-readable storage medium of claim 15, wherein the operations further comprise:

receiving, from the application at the piece of code, an outgoing message that is destined to a destination external to the application; and determining that the first write operation is pending, and responsive to this determination, preventing the outgoing message from being transmitted to the destination external to the application until the pending first write operation is confirmed.

20. The non-transitory machine-readable storage medium of claim 15, wherein the operations further comprise:

determining that a second write operation is triggered by the application for the persistent data;

performing, at the first compute server, the second write operation for the persistent data on the local storage of the first compute server;

notifying the piece of code that controls outgoing messages from the application that the second write operation for the persistent data is pending, wherein the piece of code prevents an outgoing message from the application from being transmitted to a destination external to the application until the second write operation is confirmed;

transmitting write information for the second write operation for the persistent data to the set of one or more other compute servers of the distributed cloud computing network;

queuing the write information for the second write operation for the persistent data for transmission to an external blob storage system;

receiving, from the application at the piece of code, an outgoing message that is destined to a destination external to the application; and determining that an acknowledgement of the write information for the second operation is not received at the first compute server from at least a quorum of the set of one or more other compute servers, and responsive to this determination, notifying the piece of code that the second write operation has failed and preventing the outgoing message from being transmitted to the destination external to the application.

21. The non-transitory machine-readable storage medium of claim 15, wherein the operations further comprise:

determining that a read operation is triggered by the application for the persistent data; and reading the persistent data from local storage of the first compute server.

* * * * *